United States Patent
Rhea et al.

(10) Patent No.: US 6,805,336 B2
(45) Date of Patent: Oct. 19, 2004

(54) SELF-SEALING DISPENSING VALVE FOR HUMIDIFIER WATER BOTTLES

(75) Inventors: Stephen L. Rhea, St. Peters, MO (US); Mark J. Tomasiak, O'Fallon, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/091,178

(22) Filed: Mar. 4, 2002

(65) Prior Publication Data

US 2003/0164559 A1 Sep. 4, 2003

(51) Int. Cl.⁷ .................................................. B01F 3/04
(52) U.S. Cl. ........................ 261/66; 261/72.1; 222/490
(58) Field of Search ........................... 261/66, 72.1, 73; 222/212, 490, 494, 498, 499

(56) References Cited

U.S. PATENT DOCUMENTS

| | | | |
|---|---|---|---|
| 4,728,006 A | * 3/1988 | Drobish et al. | 222/181.3 |
| 5,480,588 A | 1/1996 | Tomasiak et al. | 261/72.1 |
| 5,482,190 A | 1/1996 | Stanek et al. | 222/501 |
| 5,746,359 A | 5/1998 | Stanek et al. | 222/542 |
| 5,839,614 A | * 11/1998 | Brown | 222/185.1 |
| 6,079,823 A | * 6/2000 | Droege | 347/85 |
| 6,176,474 B1 | 1/2001 | Stanek et al. | 261/66 |
| 6,293,437 B1 | * 9/2001 | Socier et al. | 222/212 |
| 6,371,340 B1 | * 4/2002 | Pateman et al. | 222/494 |
| 6,405,901 B1 | * 6/2002 | Schantz et al. | 222/213 |
| 6,530,504 B2 | * 3/2003 | Socier | 222/494 |

* cited by examiner

*Primary Examiner*—Scott Bushey
(74) *Attorney, Agent, or Firm*—Howrey Simon Arnold & White LLP

(57) ABSTRACT

Various configurations of discharge valves for humidifier water containers are disclosed herein. Among other things, the present invention provides simple and economical discharge valves that may be constructed in one piece using an elastic material such as silicone rubber. One configuration includes a valve body and stopper with an elastic rib integrally formed with the valve body and the stopper having adequate length to maintain the stopper in a closed position absent external forces. Another configuration uses a flexible barrier is integrally formed with a valve body. The barrier has a slit through its thickness, and is sufficiently resilient to prevent liquid flow through the slit under the weight of water inside the container. In accordance with other aspects of the invention, the valve has a flexible member defining a base and a generally cylindrical sidewall that has at least one opening therethrough. When the base is deformed, such as by a plunger extending from a humidifier cabinet, the sidewall is pulled away from the humidifier bottle collar so as to allow fluid flow through the opening. A further valve configuration includes a flexible member attached to the container or to a cap that attaches to the container. A stopper extends through a water outlet in a sealing relationship and is positioned to be displaced from the outlet when the container is received in a humidifier mechanism.

3 Claims, 6 Drawing Sheets

SELF-SEALING DISPENSING VALVE FOR HUMIDIFIER WATER BOTTLES

BACKGROUND OF THE INVENTION

1. Field of Invention

This invention relates generally to fluid dispensing valves and more specifically to a self-sealing dispensing valve for humidifier water bottles.

2. Description of the Related Art

Stand-alone humidifiers, such as those commonly sold for use in homes, typically include one or more water bottles to store and provide a steady supply of water to a mechanism for humidifying air. For example, as shown in FIG. 1A, the mechanism may include a fan 1, a water tray 2 and a wick 3 partially disposed within the water tray 1. Water is discharged from a water bottle 4 into the water tray 2. The wick 3 absorbs water from the water tray 2 and, in turn, supplies moisture to the air stream propelled through the mechanism by the fan 1. The water bottle 4 may be removed from the humidifier periodically or as needed for refilling, cleaning or other purposes.

The water bottle 4 for such applications typically includes a valve assembly 5 for discharging water into the humidifying mechanism. Such discharge valve assemblies typically automatically perform at least two functions: (1) when the water bottle is removed from the humidifier, the discharge valve assembly should shut off water flow from the water bottle; (2) when the water bottle is properly seated in the humidifier, the discharge valve assembly should open a fluid flow path so that the water inside the water bottle may flow though the path into the humidifying mechanism. The valve assembly may further serve to stop further discharge of water into the humidifying mechanism when the water level in the humidifying mechanism is at or above a predetermined level.

For example, as shown in FIG. 1A, typical discharge valve assemblies are often disposed in a cap situated on the bottom portion of the humidifier water bottle 4. FIG. 1B schematically illustrates a prior art valve assembly 5 situated in a cap 6 for a humidifier water bottle. The cap 6 defines a fluid flow path 7 through which water may flow from inside the bottle to the humidifying mechanism. The cap includes a valve seat 8 with a plunger 9 biased in a closed position via a spring 10. Absent external forces, the bias spring 10 pulls the plunger 9 against the valve seat 8, thereby shutting off water flow from the water bottle 4. When the water bottle is properly seated in the humidifier, a protruding member 11 in the humidifier pushes the plunger 9 upwardly to unseat the plunger 9 and open the fluid flow path 7 and permit water in the water bottle 4 to be discharged into the water tray 2. When the water level in the water tray 2 is at or above the bottom end of the fluid flow path 7, the discharge of water stops, provided, of course, that the water bottle 4 is otherwise sealed.

Discharge valve assemblies such as those described above require multiple components, including the cap, plunger and biasing spring. The plunger may further require multiple parts, including a plunger head, stem, bolts, washers, etc. The requirement for multiple components may lead to procurement difficulties and high cost for the parts. The complex process of assembling also results in high manufacturing cost of the valve assembly.

The present invention addresses these and other problems associated with prior art.

SUMMARY OF THE INVENTION

The present invention provides a simple and economical valve assembly for humidifier water containers or bottles and the like. In accordance with one aspect of the invention, such a valve includes a valve body having a top surface, a bottom surface and a side surface. The valve body defines a passageway therein and is attachable to the container so as to form a sealing contact around the container outlet. A stopper is movable between open and closed positions, such that the stopper substantially prevents fluid flow through the passageway when the stopper is in the closed position, and permits fluid flow through the passageway when the stopper is in the open position. The passageway is in fluid communication with the outlet when the valve body is attached to the container, and the stopper is in the open position. An elastic rib integrally formed with the valve body and the stopper has an adequate length to maintain the stopper in the first position absent external forces.

In accordance with other aspects of the invention, an exemplary valve includes a valve body defining a passageway therein and is attachable to the container so as to form a sealing contact around the outlet. The passageway is in fluid communication with the outlet when the valve body is attached to the container. A flexible barrier is integrally formed with the valve body. The barrier interrupts the passageway and has a slit through its thickness. The barrier is sufficiently resilient to prevent the liquid flow through the slit from the container under the weight of water inside the container.

In accordance with other aspects of the invention, the valve has a flexible member defining a base and a generally cylindrical sidewall extending from the base. A humidifier water container defines an outlet with a generally cylindrical collar. The flexible member is removably received within the collar such that the outer surface of the flexible member sidewall seals against the collar when the base is in a first undeformed position. The sidewall has at least one opening therethrough, and when the base is deformed from the first position, such as by a plunger extending from a humidifier cabinet, the sidewall is pulled away from the collar so as to allow fluid flow through the opening.

Another exemplary valve assembly includes a flexible member having first and second ends. The first end is attached to the container or to a cap that attaches to the container. The second end defines a stopper that extends through a water outlet in a sealing relationship. The stopper is positioned to be displaced from the outlet when the container is received in a humidifier mechanism.

BRIEF DESCRIPTION OF THE DRAWINGS

Other objects and advantages of the invention will become apparent upon reading the following detailed description and upon reference to the drawings in which.

Figure 1A:
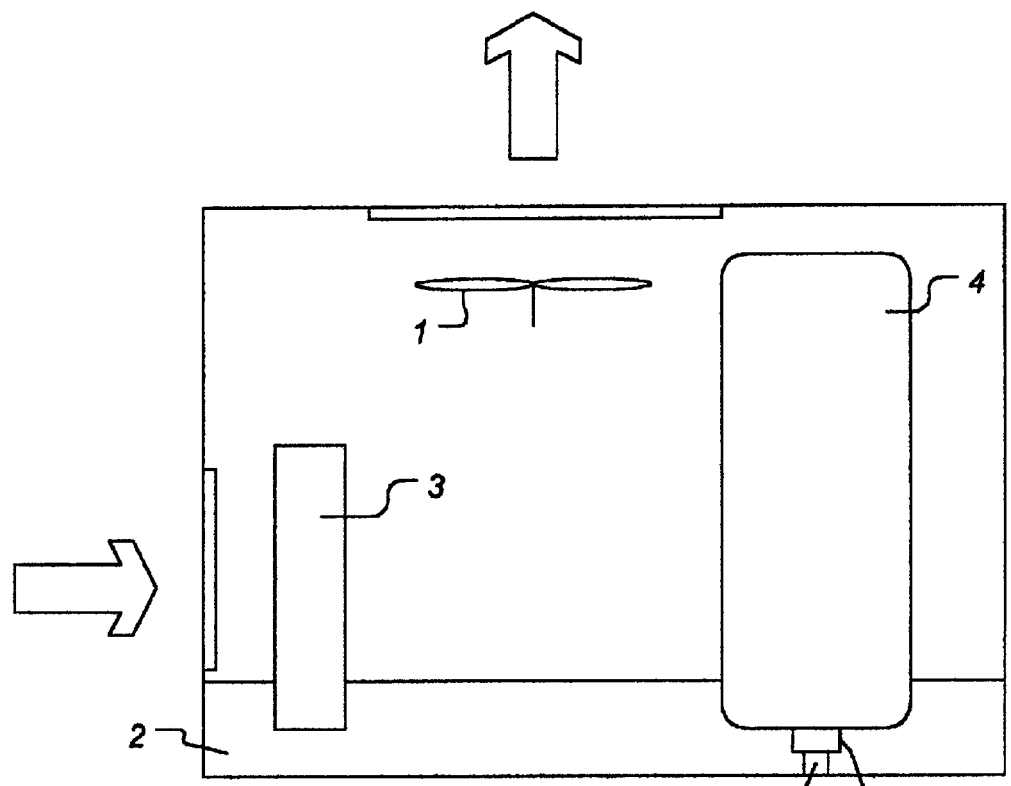
FIGS. 1A and 1B schematically illustrates aspects of a prior art humidifier and valve assembly.
Figure 1B:
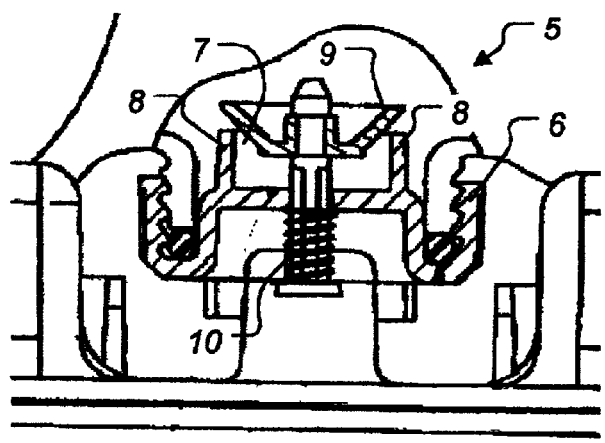

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives fling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Figure 2:
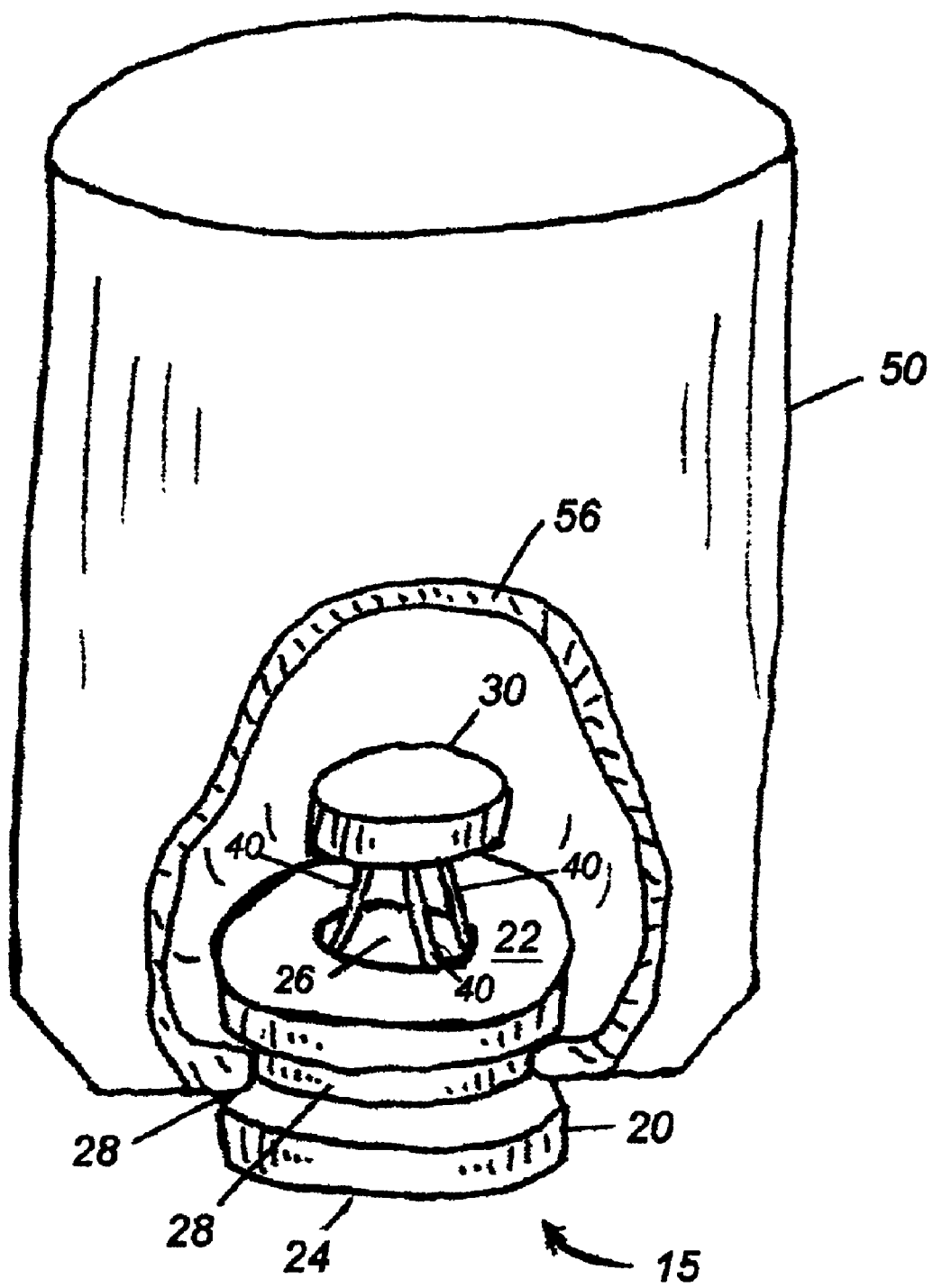
FIG. 2 illustrates a discharge valve in accordance with an exemplary embodiment of the present invention.

Referring to FIG. 2, an illustrative embodiment in accordance with the present invention is illustrated. The discharge valve 15 includes a valve body 20 having a top side 22 and bottom side 24, a stopper 30 and elastic ribs 40 extending from the bottom side of the valve body 20 to the stopper 30. The valve body 20, stopper 30 and elastic ribs 40 are integrally formed from an elastic material such as silicone rubber. The valve body 20 has a hole 26, which serves as a passage way for liquid flow. The valve body 20 is adapted to be attached to a liquid container such as a water bottle 50 with an outlet 52.

When the valve body 20 is attached to the water bottle 50, the valve body forms a sealing contact to the water bottle 50 around the outlet 52. In this illustrative embodiment, the valve body 20 is of a hollow cylindrical shape with a groove 28 formed around the curved surface. The valve body 20 may be attached to the water bottle 50 by placing the valve body 20 inside the outlet 52 so that the groove 28 fits over the water bottle wall 56 surrounding the outlet 52. The size of the valve body 20 and the size of the groove 28 are such that, because of the resiliency of the material used to make the valve 15, a sealing contact is formed between the valve body 20 and the water bottle 50 around the outlet 52.

Figure 3A:
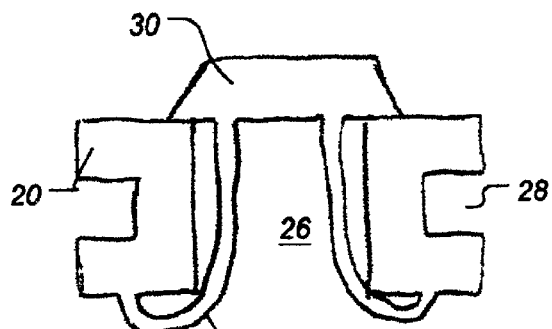
FIGS. 3A–3C are sectional views schematically illustrating further aspects of the valve shown in FIG. 2.
Figure 3B:
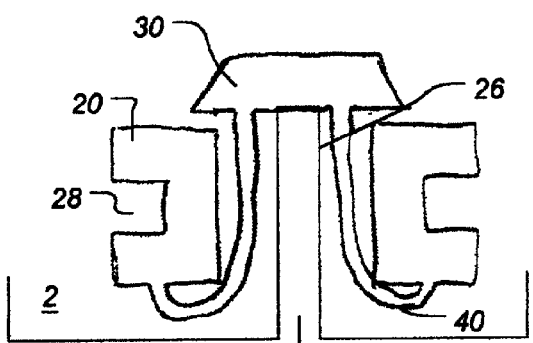

The stopper 30 is positioned over the hole 26 on the side of the water bottle 50. The ribs 40 are sufficiently short so that absent external forces, the stopper 30 is pulled to a "closed" position against the top surface 22 of the valve body 20, sealing the hole 26 to prevent liquid flow from the water bottle. Such a "closed" position is illustrated in FIG. 3A. Under sufficient external force, the ribs 40 may be stretched further, and the stopper 30 may be pushed away from the valve body 20 to an "open" position to permit liquid flow from the water bottle 50 as shown in FIG. 3B. The force may be exerted, for example, by a member 11 protruding upwardly through the hole 26 from a supporting surface when the water bottle 50 is lowered to rest on the supporting surface with the valve located at the bottom of the water bottle 50.

Figure 3C:
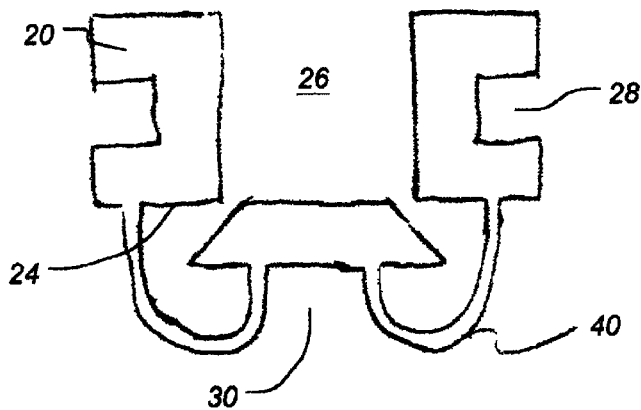

The discharge valve 15 illustrated in FIG. 2 may be made in essentially two steps. First the valve body 20, the stopper 30 and the elastic ribs 40 are molded as a single piece, with the stopper positioned on the bottom side 24 of the valve body 20, as shown in FIG. 3C. Next, the stopper 30 is pushed through the hole 26 on the valve body 20 to above the top surface 22 of the valve body 20 to the position shown in FIG. 3A. The elastic ribs 40 are sufficiently short so that they must be stretched at least slightly in order to push the stopper 30 to above the top surface 22 of the valve body 20.

Figure 4:
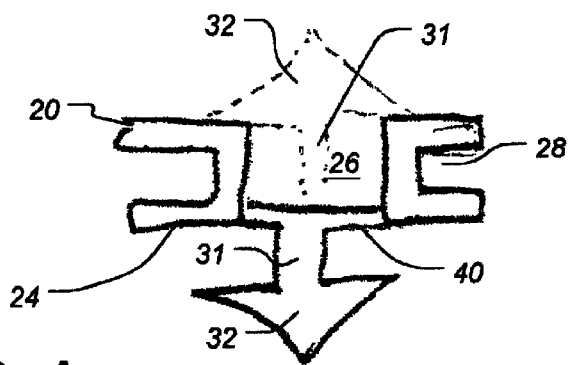
FIG. 4 shows an exemplary alternative stopper configuration to that shown in FIG. 2.

An alternative stopper configuration is illustrated in FIG. 4, in which the elastic ribs 40 connect a centrally located stem 31 to the stopper 32. The stem 31 and stopper 32 are shown in their "as molded" positions in solid lines in FIG. 4. As described above in conjunction with FIGS. 3A and 3C, the discharge valve is molded as a single piece, with the stem 31 and stopper 32 located below the valve body 20. The stem 31 and stopper 32 are rotated and pushed through the hole 26 to the sealing position, shown in broken lines in FIG. 4. The elastic ribs 40 provide the sealing down force on the stopper 32 via the stem 31.

Figure 5:
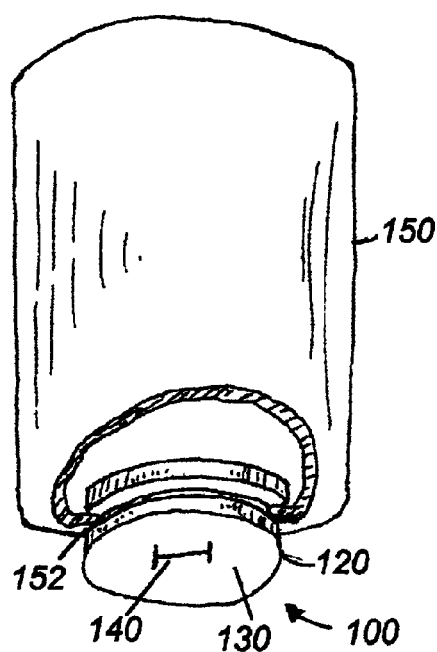
FIG. 5 illustrates a discharge valve in accordance with another exemplary embodiment of the present invention.
Figure 6:
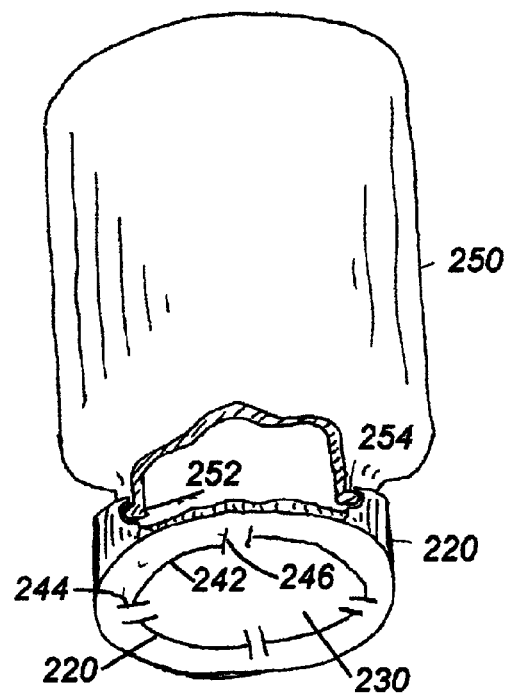
FIG. 6 illustrates a discharge valve similar to that shown in FIG. 5, employing an alternative discharge configuration.

Referring to FIG. 5, in another illustrative embodiment in accordance with the present invention, the discharge valve 100 includes a valve body 120 and a flexible barrier 130 integrally formed with the valve body 120. The valve body 120 is adapted to be attached to a liquid container such as a water bottle 150 with an outlet 152 and form a sealing contact to the water bottle around the outlet 152 in the same way as the valve body 20 in the illustrative embodiment shown and described in conjunction with in FIG. 2. Other structures may be employed to achieve the same purposes. For example, the valve body 220, illustrated in FIG. 6, is a cap-like structure that is integrally formed with a flexible barrier 230 and is tightly fitted over a ridge 254 around the outlet 252 of the water bottle 250.

Figure 7A:
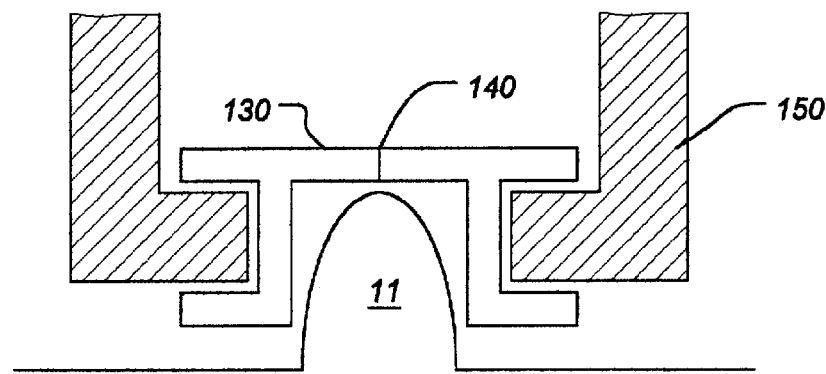
FIGS. 7A and 7B are sectional views illustrating further aspects of a discharge valve such as those shown in FIGS. 5 and 6.
Figure 7B:
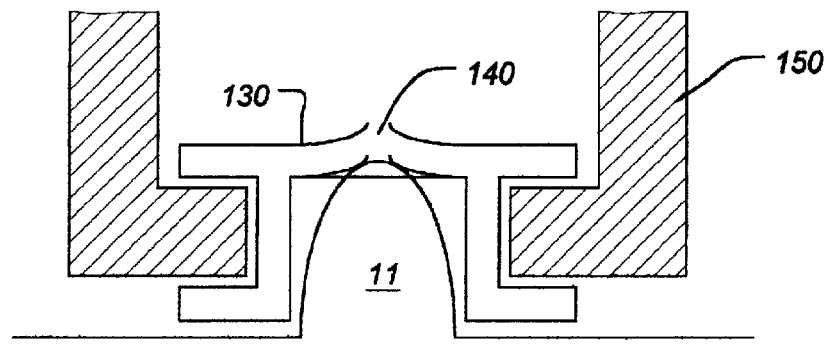

The flexible barrier 130 or 230 has a slit 140 or 240 cut through the thickness of the barrier. The flexible barrier 130 or 230, which may be fabricated from an elastic material such as silicone rubber, is sufficiently resilient so that absent other external forces, the water inside the water bottle 150 or 250 cannot escape through the slit. Under sufficient force, the barrier 130 or 230 may be deformed to a sufficient degree to open the slit to permit liquid flow from the water bottle 150 or 250. FIGS. 7A and 7B schematically illustrate the flexible barrier 130 in the closed and open positions, respectively. The force may be exerted, for example, by a member 11 protruding upward from a supporting surface in the humidifier when the water bottle 150 is lowered to rest on the supporting surface with the valve located at the bottom of the water bottle 150.

Figure 8A:
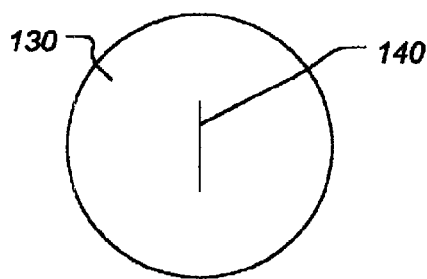
FIGS. 8A and 8B illustrate alternative discharge slit configurations suitable for a discharge valves such as those shown in FIGS. 5 and 6.
Figure 8B:
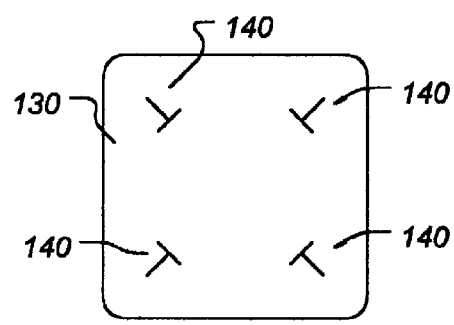

The slit may define any of several shapes. It may be H-shaped, as shown in FIG. 5, or C-shaped with short cut segments 244 and 246 at the end of the C-segment 242 as shown in FIG. 6, to increase the rate of discharge. FIGS. 8A and 8B illustrate other exemplary slit shapes, including a straight cut and multiple T-shaped cuts, respectively.

Figure 9A:
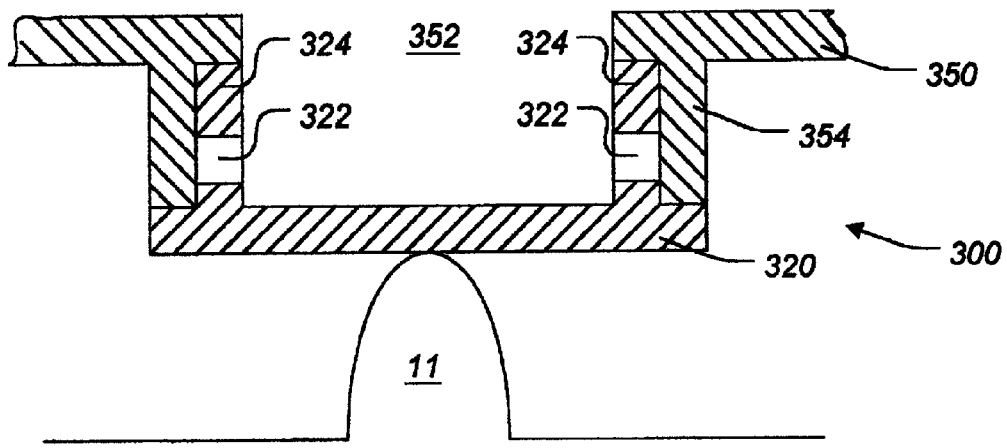
FIGS. 9A and 9B illustrate a further exemplary embodiment of a discharge valve in accordance with the present invention.
Figure 9B:
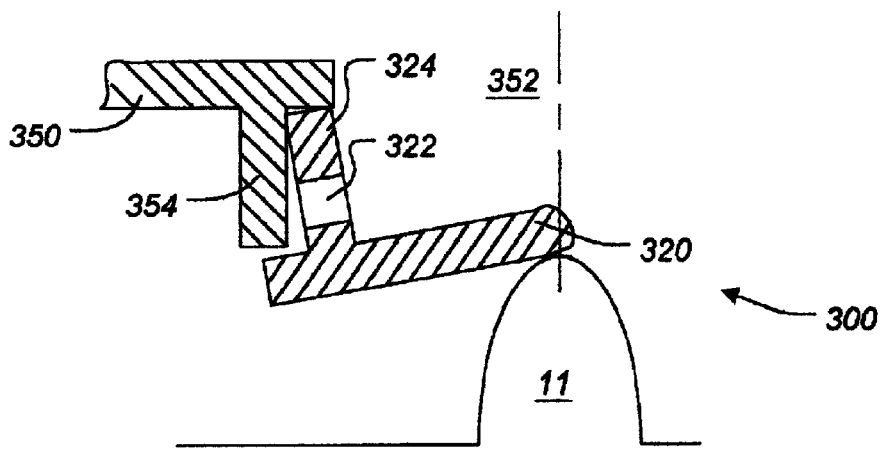

FIGS. 9A and 9B illustrate yet another discharge valve in accordance with aspects of the present invention The discharge valve 300 includes a flexible cap 320 that defines one or more openings 322 extending through the sidewall 324 of the cap 320. The sidewall 320 is generally cylindrical in shape. The flexible cap may be fabricated out of any suitable flexible material, such as silicone rubber. In a "closed" position, the sidewall 324 seals against the bottle 350 as shown in FIG. 9A. The bottle 350 typically includes an outlet 352 defining a cylindrical collar 354 therearound, wherein the sidewall 324 seals against the collar 354. FIG. 9B illustrates the cap 322 (only one half of the cap 322 is shown for clarity) as deformed by the member 11 protruding from the humidifier cabinet. The upward force exerted by the member 11 rotates the sidewall 324 away from the bottle 350, thus allowing the discharge of water through the opening 322. Any suitable number of openings 322 may be formed in the sidewall 324.

Figure 10:
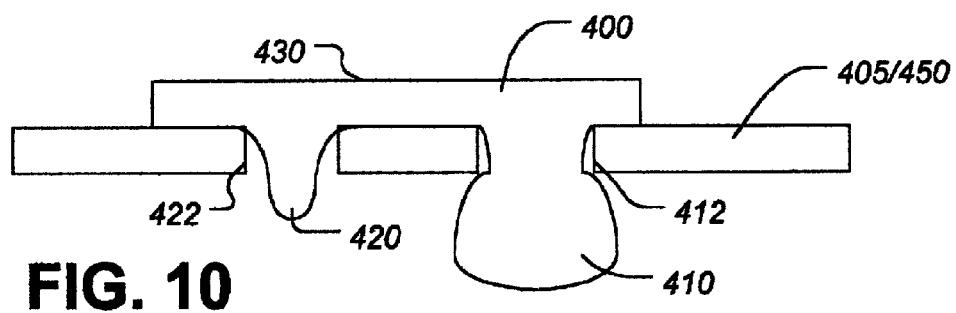
FIG. 10 illustrates yet another discharge valve in accordance with aspects of the present invention.

A further discharge valve is shown in FIG. 10, in which a flexible one-piece stopper 400 is attached to the bottom portion of a cap 405 or alternatively, directly to a humidifier bottle 450. Again, the stopper 400 may be fabricated from any suitable elastic material, such as silicone rubber. In the exemplary embodiment illustrated in FIG. 10, the stopper 400 is attached to the bottle 450 via a bulb 410 extending through an opening 412 in the bottle 450. The bulb 410 is of a shape and size to self-seal when situated in the hole 412. A stopper portion 420 extends through a second hole 422 to prevent water from leaving the bottle 450 when in a closed position. Hydrostatic pressure on the upper side 430 stopper 400 seals the stopper portion 420 in the hole 422. When positioned in a humidifier, the protruding member 11 (not shown in FIG. 10) exerts a force against the stopper portion 420, displacing it from the hole 422 and breaking the seal, allowing water to exit the bottle 450.

Thus, the present invention provides benefits over prior art valves used for dispensing water into humidifiers, including simplicity and reduced cost. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A humidifier assembly, comprising:
    a water tray;
    a water bottle defining an outlet;
    a valve for discharging water from the bottle into the water tray, the valve including:
        a body having a top surface, a bottom surface and a side surface, the valve body defining a passageway therein, the valve being attachable to the bottle so as to form a sealing contact with the outlet, the passageway being in fluid communication with the outlet when the valve body is attached to the bottle; and
        a flexible barrier having a thickness and integrally formed with the valve body, the barrier interrupting the passageway and defining a slit through the thickness, the barrier being sufficiently resilient to prevent the liquid flow through the slit from the container under the weight of water inside the bottle; and
    a member protruding from the water tray situated to exert a force against the flexible barrier so as to deform the flexible barrier and open the slit to allow water to escape from the slit into the water tray.

2. The humidifier assembly of claim 1, wherein the slit comprises a plurality of slits.

3. The humidifier assembly of claim 1, wherein the slit is generally H-shaped.

* * * * *

UNITED STATES PATENT AND TRADEMARK OFFICE
CERTIFICATE OF CORRECTION

PATENT NO. : 6,805,336 B2
DATED : October 19, 2004
INVENTOR(S) : Steven L. Rhea and Mark J. Tomasiak It is certified that error appears in the above-identified patent and that said Letters Patent is hereby corrected as shown below:

Title page,
Item [75], Inventors, change "Stephen" to -- Steven --.

Signed and Sealed this

Twenty-first Day of February, 2006

JON W. DUDAS
*Director of the United States Patent and Trademark Office*